United States Patent
Srivastava et al.

(10) Patent No.: US 11,281,540 B2
(45) Date of Patent: Mar. 22, 2022

(54) REMOTE DATA FORWARDING USING A NOCOPY CLONE OF A PRODUCTION VOLUME

(71) Applicant: EMC IP HOLDING COMPANY LLC, Hopkinton, MA (US)

(72) Inventors: Akshay Kumar Srivastava, Bangalore (IN); Sandeep Chandrashekhara, Shrewsbury, MA (US); Michael Ferrari, Douglas, MA (US); Deepak Vokaliga, Hopkinton, MA (US); Darren Fernandes, Brighton, MA (US)

(73) Assignee: Dell Products, L.P., Hopkinton, MA (US)

( * ) Notice: Subject to any disclaimer, the term of this patent is extended or adjusted under 35 U.S.C. 154(b) by 199 days.

(21) Appl. No.: 16/776,615

(22) Filed: Jan. 30, 2020

(65) Prior Publication Data
US 2021/0240568 A1 Aug. 5, 2021

(51) Int. Cl.
*G06F 16/27* (2019.01)
*G06F 11/14* (2006.01)
*G06F 16/21* (2019.01)

(52) U.S. Cl.
CPC ...... *G06F 11/1451* (2013.01); *G06F 11/1456* (2013.01); *G06F 16/214* (2019.01); *G06F 16/27* (2019.01); *G06F 2201/84* (2013.01)

(58) Field of Classification Search
CPC ..... G06F 16/2211; G06F 16/214; G06F 16/27
See application file for complete search history.

(56) References Cited

U.S. PATENT DOCUMENTS

| | | | | |
|---|---|---|---|---|
| 6,631,366 B1* | 10/2003 | Nagavamsi | ......... | G06F 16/2455 707/999.102 |
| 7,165,158 B1* | 1/2007 | Yagawa | ................ | G06F 16/119 711/114 |
| 8,700,570 B1* | 4/2014 | Marathe | .............. | G06F 16/1824 707/634 |
| 10,976,937 B1* | 4/2021 | Quinn | ................... | G06F 3/0607 |
| 2007/0233979 A1* | 10/2007 | Beardsley | ........... | G06F 11/2069 711/162 |
| 2009/0313428 A1* | 12/2009 | De Jong | ............. | G06F 11/2082 711/E12.001 |
| 2013/0173537 A1* | 7/2013 | Wilkinson | .......... | G06F 11/1469 707/611 |
| 2020/0081629 A1* | 3/2020 | Brown | .................... | G06F 11/14 |

* cited by examiner

*Primary Examiner* — Eliyah S. Harper
(74) *Attorney, Agent, or Firm* — Anderson Gorecki LLP (57) ABSTRACT

A remote data facility includes a primary storage volume on a first storage system mirrored to a backup storage volume on a second storage system. A nocopy clone of a production volume is added to the primary storage volume. A define process is used to cause the tracks of the nocopy clone to point to backend allocations of tracks of memory of the production volume. As tracks of the nocopy clone are defined, corresponding flags are marked as invalid to cause data associated with the tracks to be replicated across the remote data facility to the backup storage volume. Incremental clones can be added to the primary storage volume, defined, and replicated on the remote data facility using the same process. Nocopy clones and target-less nocopy snapshots of the backup storage volume are used to restore the production volume using failover/failback mechanisms of the remote data facility.

14 Claims, 9 Drawing Sheets

REMOTE DATA FORWARDING USING A NOCOPY CLONE OF A PRODUCTION VOLUME

FIELD

This disclosure relates to computing systems and related devices and methods, and, more particularly, to a method for replicating data between storage systems.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A remote data facility includes a primary storage volume on a first storage system mirrored to a backup storage volume on a second storage system. A nocopy clone of a production volume is added to the primary storage volume. A define process is used to cause the tracks of the nocopy clone to point to backend allocations of tracks of memory of the production volume. As tracks of the nocopy clone are defined, corresponding flags are marked as invalid to cause data associated with the tracks to be replicated across the remote data facility to the backup storage volume. Incremental clones can be added to the primary storage volume, defined, and replicated on the remote data facility using the same process. Nocopy clones and target-less nocopy snapshots of the backup storage volume are used to restore the production volume using failover/failback mechanisms of the remote data facility.

DETAILED DESCRIPTION

Figure 1:
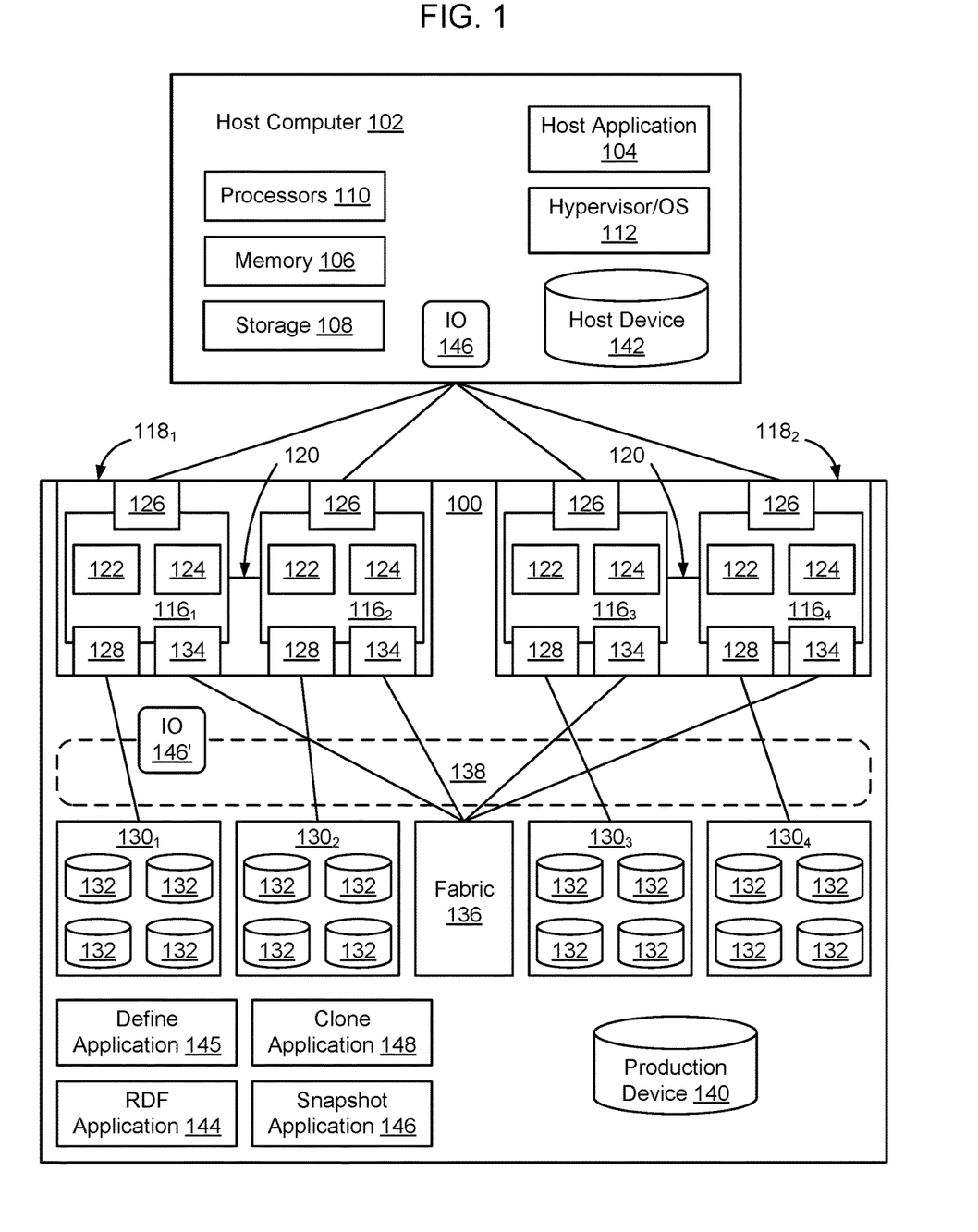
FIG. 1 is a functional block diagram of an example storage system connected to a host computer, according to some embodiments.

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (operating system) 112. The processors 110 may include one or more multi-core processors that include multiple CPUs, GPUs, and combinations thereof. The host volatile memory 106 may include RAM (Random Access Memory) of any type. The persistent storage 108 may include tangible persistent storage components of one or more technology types, for example and without limitation Solid State Drives (SSDs) and Hard Disk Drives (HDDs) of any type, including but not limited to SCM (Storage Class Memory), EFDs (enterprise flash drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back end adapters 128 for communicating with respective associated back end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using Non-Volatile Memory (NVM) media technologies, such as NAND-based flash, or higher-performing Storage Class Memory (SCM) media technologies such as 3D XPoint and Resistive RAM (ReRAM). Managed drives 132 may be directly connected to the compute nodes $116_1$-$116_4$, using a PCIe bus or may be connected to the compute nodes $116_1$-$116_4$, for example, by an InfiniBand (IB) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via Direct Memory Access (DMA) or Remote Direct Memory Access (RDMA).

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104. A volume of data associated with a production device 140 will be referred to herein as a "production volume 141".

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (logical block addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application 104 data in the virtual shared global memory 138 and the managed drives 132. In response to an IO (input/output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

There may be multiple paths between the host computer 102 and the storage system 100, e.g. one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 via one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes 116$_1$-116$_4$ and paths, although the storage system 100 can be configured to limit use of certain paths to certain production devices 140 (zoning).

In some embodiments, the storage system 100 includes one or more system applications configured to enable volumes of data, such as the production volume 141 associated with production device 140, to be copied locally within storage system 100 or to be mirrored to another storage system 100. Example system applications shown in FIG. 1 include Remote Data Forwarding (RDF) application 144, snapshot application 146, clone application 148, and define application 145. In some embodiments, the system applications are implemented as applications executing within virtual machines on storage system 100.

Figure 2:
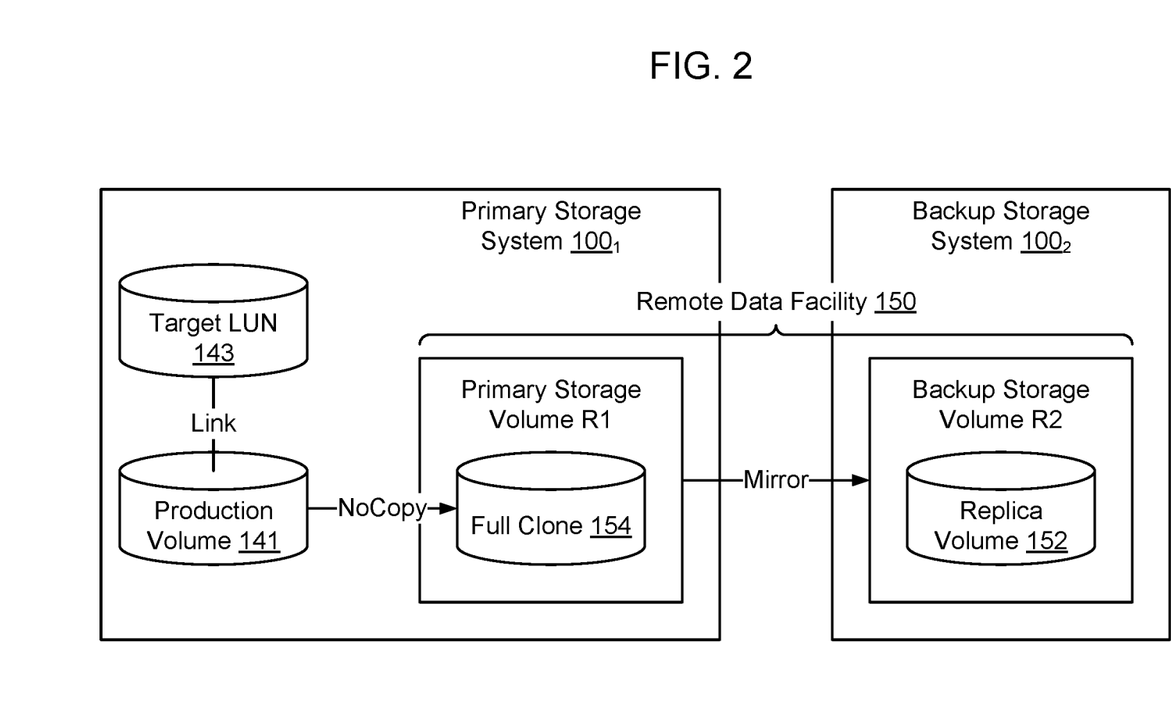
FIG. 2 is a functional block diagram of a primary/backup pair of storage systems that are configured to implement a remote data facility, in which a nocopy clone of a production volume on the primary storage system is included in the primary storage volume R1 in the remote data facility, according to some embodiments.

For example, one system application that may be executing in a virtual machine on storage system 100 is a Remote Data Forwarding (RDF) application 144. RDF application 144, when executed on storage system 100, enables a given storage system 100 to participate in storage system level data replication between sets of mirroring pairs of storage systems 100. The RDF application 144 is configured to cause subsets of data stored within managed drives 132 of storage system 100 to be mirrored by the storage system 100 to one or more similar backup storage systems 100. A set of storage systems 100 that are configured for data to be mirrored from a primary storage system 100$_1$ to a backup storage system 100$_2$ will be referred to herein as a "Remote Data Facility" 150. FIG. 2 shows one example pair of storage systems 100 arranged in a remote data facility 150, in which a portion of the data stored on managed drives 132 of a primary storage system 100$_1$ is mirrored by remote data forwarding application 144 to a backup storage system 100$_2$ on the remote data facility 150.

A given storage system 100 may operate as a primary storage system 100$_1$ or backup storage system 100$_2$ in many mirroring pairs, and hence multiple RDF applications 144 may simultaneously execute on storage system 100 to control participation of the storage system 100 in mirroring operations on multiple remote data facilities 150. The data at the primary storage system 100$_1$ that is to be mirrored on a particular remote data facility 150 will be referred to as the "primary storage volume R1". The data that is received by the backup storage system 100$_2$ on the remote data facility 150 will be referred to herein as the "backup storage volume R2."

Data transfer between storage systems 100, including transfers between storage systems 100 for data replication (mirroring) functions, may take place in several ways depending on how the primary storage system 100$_1$ handles data written by the host application 104 and how the backup storage system 100$_2$ acknowledges receipt of data on the remote data facility 150. Two example data mirroring modes will be referred to herein as synchronous (SYNC) and asynchronous (ASYNC). Other mirroring modes such as adaptive copy mirroring mode may additionally exist depending on the implementation.

Another application that may be executing in a virtual machine on storage system 100 is a snapshot application (SNAP) 146. Multiple SNAP applications 146 may be executing on a given storage system 100 at any point in time. In some embodiments, snapshot application 146 is configured to provide point in time data copying. One example snapshot application 146 is the EMC TimeFinder SnapVX snapshot application, although multiple types of snapshot applications 146 may be used depending on the implementation.

Snapshot application 146, in some embodiments, is configured to create "snapshots" of a volume of data. A "snapshot," as that term is used herein, is a copy of a volume of data as that volume existed at a particular point in time. A snapshot of a production volume 141, accordingly, is a copy of the data of the production volume 141 as the data contained in the production volume 141 existed at the point in time when the snapshot of the production volume 141 was created.

A snapshot can be either target-less (not linked to a device) or may be linked to a target device when created. When a snapshot of a production volume is created, the snapshot may include all of the data of the production volume, or only the changes to the production volume that have occurred since the previous snapshot was taken.

Another application that may be executing in a virtual machine on storage system 100 is a clone application 148. One example clone application 148 is the EMC TimeFinder Clone application, although multiple types of clone applications 148 may be used depending on the implementation.

Clone application 148, like snapshot application 146, is configured to create a point in time copy of a volume of data as that volume existed at a particular point in time. Accordingly, a "clone" of a volume of data is the same as a "snapshot" of the volume of data. However, one difference between a snapshot and a clone is that a snapshot may be target-less when created, whereas a clone is always linked to a device—the clone application 148 is not configured to create target-less point in time copies. A clone, like a snapshot, can be include all of the data of the production volume, or only the changes to the production volume that have occurred since the previous clone was taken.

For convenience, this disclosure will use the term "clone" in a generic manner to refer to any point-in-time copy of a production volume 141, whether created by snapshot application 146 or clone application 148. Clones can be either "full clones" or "incremental clones". The term "full clone" will be used to refer to a copy of an entire production volume 141. The term "incremental clone" will be used to refer to a copy of the changes to the production volume 141 that occurred in the time window since creation of a previous full clone or since creation of a previous incremental clone. In instances where a target-less point-in-time copy of a production volume needs to be created, the term "target-less snapshot" will be used.

When a clone of a production volume 141 is created, the clone can be created as either as a full-copy clone or as a nocopy clone. A full-copy clone is created by having either the snapshot application 146 or the clone application 148 create an exact copy of the data contained in the production volume. A full-copy clone, therefore, consumes the same volume of storage tracks on managed drives 132 as the production volume 141, which is costly from a storage resource utilization perspective.

A nocopy clone, by contrast, does not require the snapshot application 146 or the clone application 148 to actually create a copy of the data of the production volume 141. Accordingly, a nocopy clone does not cause the data of the production volume to be copied to separate storage resources on managed drives 132, but rather the nocopy clone is linked in nocopy mode to the production volume 141, such that the target tracks 160 of the nocopy clone 154 point to the correct backend tracks 155 of the production volume 141 on the managed drives 132. This enables the same backend tracks 155 to be pointed at by both the production volume 141 and the nocopy clone 154, thus greatly reducing the amount of storage resources required to implement the clone.

In nocopy mode, data of a production volume 141 is not copied to the nocopy clone 154, but rather the tracks 160 of the nocopy clone 154 are linked to the backend tracks 155 of the managed drives 132 used by the production volume 141. Thus, the nocopy clone 154 has access to the same backend tracks 155 as the production volume 141 and can be used by the host application 104 or other application to access the production volume 141. In some embodiments, the nocopy mode can be implemented using a copy on write mode or redirect on write mode. A copy on write mode causes data to be copied when the write on the production volume 141 happens. With redirect on write mode, any new write on a track 155 of the production volume 141 will get a new allocation of backend tracks 155. Old backend allocations, having the old data, will be saved in a replication data pointer module that is used to keep track of point-in-time data when there are writes to the production volume 141 after the clone is created.

One reason to create a clone of a production volume is to reduce impact on the production volume 141 associated with mirroring the production volume 141 on a remote data facility 150. Unfortunately, using a full copy clone as the primary storage volume R1 in a remote data facility 150 requires the use of double the amount of storage resources of managed drives 132. It also is costly because remote replication on the remote data facility 150 can only start when the copy for the full copy clone is completed, which results in an elongated recovery point objective (a recovery point objective is the number of files that must be recovered from backup storage for normal operation to resume as a result of failure).

According to some embodiments, a system and method are provided that enables a nocopy clone 154 of a production volume 141 to be included in the primary storage volume R1 of a remote data facility 150. Including a nocopy clone of the production volume 141 in the primary storage volume R1 of the remote data facility limits the performance impact that the remote data facility 150 will have on the production volume 141. By including the nocopy clone 154 instead of the production volume 141 in the primary storage volume R1 in the remote data facility 150, the benefits of the remote data facility 150 for disaster recovery can be realized, while leveraging the space efficiency of a nocopy clone 154. This results in tremendous space savings for the customer.

Additionally, as discussed in greater detail below, in some embodiments a define application 145 is used to execute a define process that causes the tracks 160 of the nocopy clone 154 to point at the same backend tracks 155 of the managed drives 132 that are used by the production volume 141. Using a define process is much faster than actually copying the data (which would be required with a full copy clone) and hence the recovery point objective is significantly reduced. Finally, including the nocopy clone 154 in the primary storage volume R1 of the remote data facility 150 reduces use of general system resources, such as processor 122 time and cache resources, by reducing the amount of data that must be copied to implement the nocopy clone 154.

FIG. 2 is a functional block diagram of a primary/backup pair of storage systems $100_1$, $100_2$ that are configured to implement a remote data facility 150, in which a full nocopy clone 154 of a production volume 141 on the primary storage system $100_1$ is included in the primary storage volume R1 in a remote data facility 150. For convenience, the figures will show a single remote data facility 150 implemented between a pair of storage systems $100_1$, $100_2$. Although the description will focus on inclusion of the full nocopy clone 154 in the primary storage volume R1, additional data may also be included in the primary storage volume R1, and any data that is included in the primary storage volume R1 will be replicated on the remote data facility 150. Thus, for example, incremental clones of the production volume 141 may be included in the primary storage volume R1 (see FIG. 6) and also replicated on the remote data facility 150. Similarly, a target-less snapshot of the production volume 141 can be created, and then linked to the primary storage volume R1 to be replicated on the remote data facility.

Figure 5:
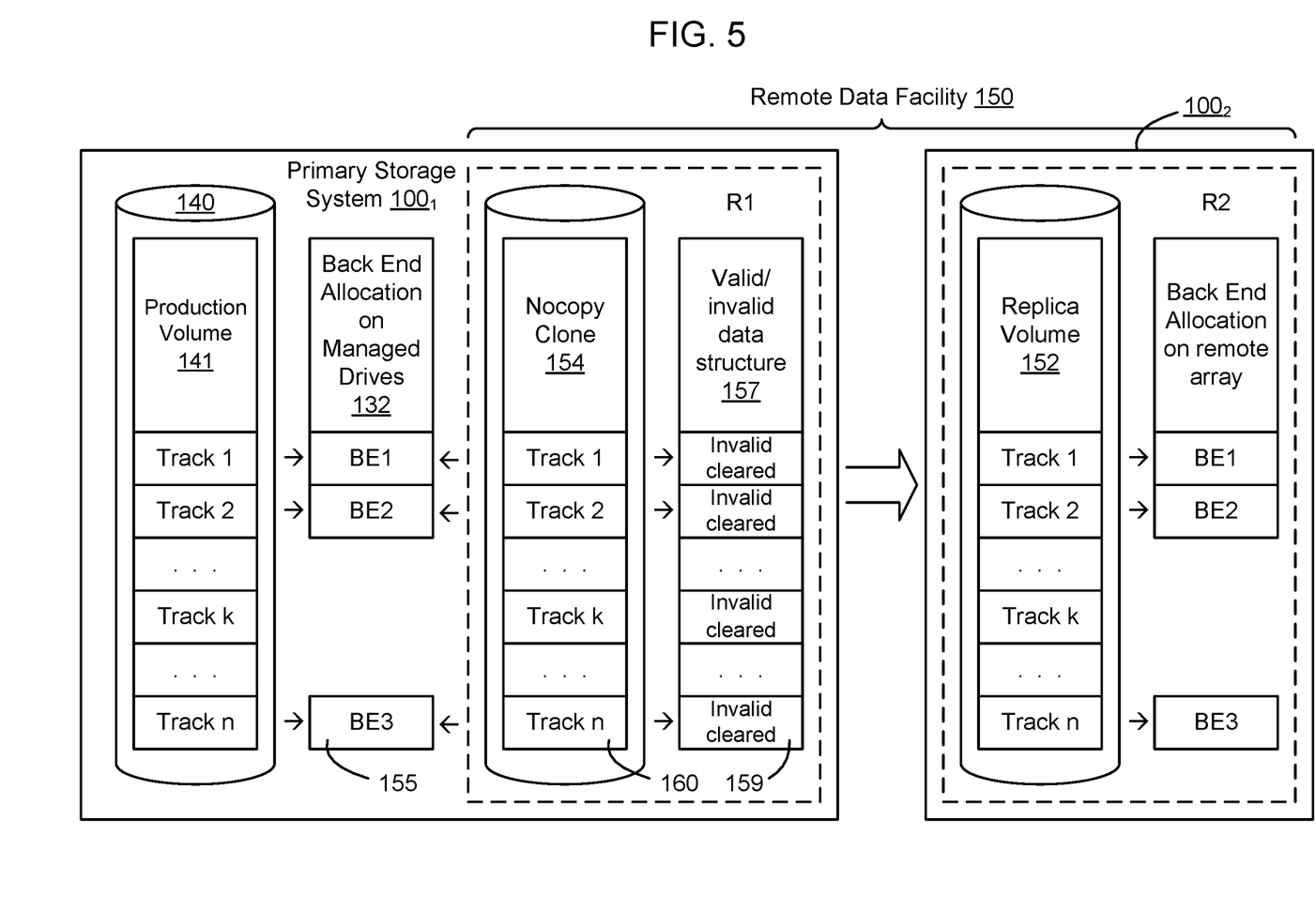
FIG. 5 is a functional block diagram of the primary/backup pair of storage systems of FIG. 2, showing changes to the data structures associated with the remote data facility in connection with implementation of the define process of the nocopy clone, according to some embodiments.

As shown in FIGS. 2 and 5, in some embodiments a primary storage system $100_1$ has a production volume 141 that is used to store data for host application 104. A target LUN 143 is linked to the production volume 141, and the target LUN 143 is used by host application 104 as host device 142. IO read/write operations by host application 104 are implemented by host application 104 on host device 142, which causes associated accesses (reads) and changes (writes) to backend tracks 155 of data on managed drives 132 being used by storage system $100_1$ to implement the production volume 141.

To protect against failure, it is often desirable to enable the production volume 141 to be mirrored on a remote data facility 150 to a replica volume 152 on a backup storage system $100_2$, so that in the event of a problem with production volume 141, the host application 104 can use the replica volume 152 at the backup storage system $100_2$ (failover). Failover allows the host application 104 to continue accessing the production volume 141 on the backup storage system $100_2$. At a later point, responsibility for the production volume 141 can be returned (failback) to the primary storage system $100_1$.

As noted above, depending on the implementation, a given host application 104 may not want the actual production volume 141 to be included in the primary storage volume R1 of the remote data facility 150, for example to reduce impact on the production volume 141.

According to some embodiments, a full nocopy clone 154 of a production volume 141 is created and added to the primary storage volume R1 in the remote data facility 150. The full nocopy clone 154 contains pointers to the tracks of data 155 on managed devices 132 that are used to store the data associated with the production volume 141, which enables the data associated with the production volume 141 to be replicated on the remote data facility 150. However, since the full clone 154 is a nocopy clone, the data of the production volume 141 is not required to be copied into a separate area of storage on storage devices 132 in connection with adding the full nocopy clone 154 to the primary storage volume R1.

Figure 3:
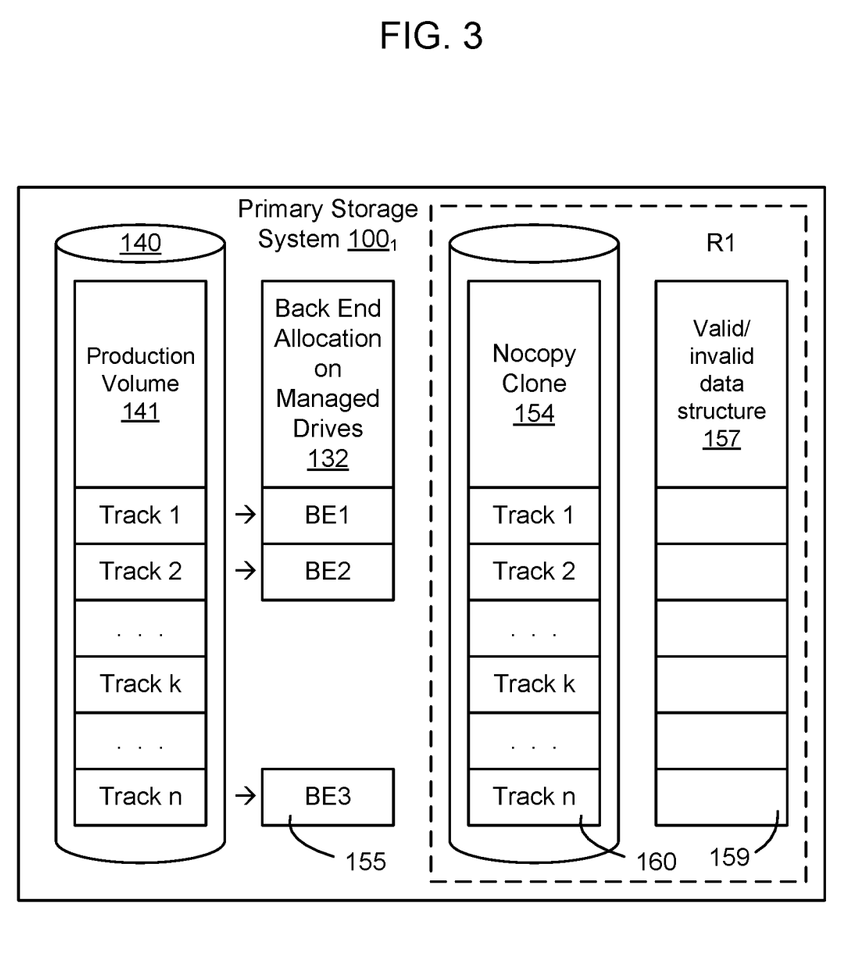
FIG. 3 is a functional block diagram of the primary storage system of FIG. 2, showing a state of the primary storage system at a start of a define process of the nocopy clone, according to some embodiments.
Figure 4:
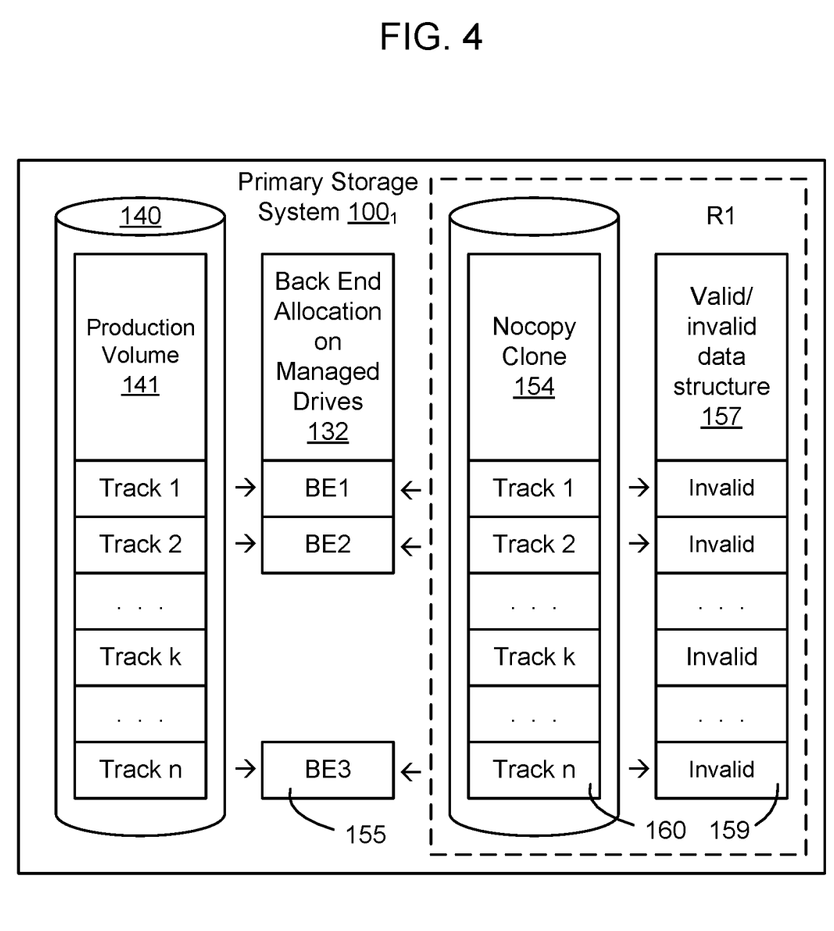
FIG. 4 is a functional block diagram of the primary storage system of FIG. 2, showing a state of the primary storage system during the define process of the nocopy clone, according to some embodiments.

FIG. 3 is a functional block diagram of the primary storage system $100_1$ of FIG. 2, showing a state of the primary storage system $100_1$ when the full nocopy clone 154 is first created. FIG. 4 is a functional block diagram of the primary storage system $100_1$ of FIG. 2, showing a state of the primary storage system $100_1$ during the define process of the nocopy clone 154. FIG. 5 is a functional block diagram of the primary/backup pair of storage systems 100 of FIG. 2, showing changes to the data structures associated with the remote data facility 150 in connection with implementation of the define process on the nocopy clone 154.

As shown in FIG. 3, when a nocopy clone 154 is first created on the primary storage system $100_1$, the tracks 160 of the nocopy clone 154 do not point to the backend allocation of backend tracks 155 on managed drives 132 of the primary storage system $100_1$. According to some embodiments, a define application 145 is used to implement a define process that cause the tracks 160 of the nocopy clone 154 to point to the same tracks of managed drives 132 that are used as the backend allocation of backend tracks 155 for the production volume 141.

As used herein, the term "define" is used to refer to a process that changes the pointers of tracks of a target linked volume to share the same backend data as the source volume. When a target volume is linked, the define process scans the entire target device. The define process changes the pointers of each track on the target device to share the appropriate backend data of the source volume, which will typically be a combination of source tracks and snapshot changes. The define application 145 and shared backend allocations of backend tracks 155 allow the target device to access the data stored in the backend tracks 155 directly, without action by the source device. Thus, when a nocopy clone 154 of a production volume 141 is created and the nocopy clone tracks 160 of the nocopy clone 154 are "defined", the nocopy clone 154 can access the tracks 155 of the production volume 141 directly, to enable the nocopy clone 154 to assume responsibility for operations associated with participation in the remote data facility 150.

As shown in FIG. 3, initially when the nocopy clone 154 is linked to the production volume 141, the tracks 160 of the nocopy clone 154 do not point to the same backend allocation of backend tracks 155 on managed drives 132 of the primary storage system $100_1$. As the define application 145 executes, the tracks 160 of the nocopy clone 154 are caused to point to the correct backend allocation of backend tracks 155 on managed drives 132 of primary storage system $100_1$. This is shown in FIG. 4. A track 160 of the nocopy clone 154 is said to be "defined" when the track 160 shares or points to the respective data of the corresponding track 155 of the production volume 141. In some embodiments, a device track is the minimum granularity for preserving point-in-time data, although other track sizes may be used as well.

As shown in FIG. 4, in some embodiments a valid/invalid data structure 157 containing a set of flags 159 is used to push data associated with changed data on the remote data facility 150 from the primary storage volume R1 to the backup storage volume R2. In some embodiments, flags 159 are binary, and each flag is used to indicate whether a track associated with the flag is valid or invalid. When a flag 159 associated with a track is marked as invalid, the data associated with the track will be replicated on the remote data facility 150. Once the data has been replicated to the backup storage volume R2, the flag 159 is cleared (changed to valid) to indicate that the data associated with the track has been mirrored on the remote data facility 150. Since the nocopy clone 154 is included in the primary storage volume R1, whenever a track 160 of the nocopy clone 154 is defined to point to a backend allocation of backend tracks 155, the flag 159 associated with track 160 of the nocopy clone 154 is marked as invalid in the valid/invalid data structure 157. Marking a track 160 as invalid causes the data associated with the new track allocation 155 to be replicated on the remote data facility 150 to the backup storage volume R2.

Accordingly, as shown in FIG. 4, as the tracks 160 of the nocopy clone 154 are defined, of the tracks of the nocopy clone 154 are marked as invalid in corresponding flags 159 in the valid/invalid data structure 157. Any track having an invalid flag will be copied on the remote data facility to the backup storage volume R2. As shown in FIG. 5, as the data associated with the tracks 160 of the nocopy clone 154 are copied to the backup storage system $100_2$, the corresponding flags 159 are cleared in the valid/invalid data structure 157. Accordingly, in connection with the initial define process of nocopy clone 154, all tracks 160 of the nocopy clone 154 are copied on the remote data facility 150 to the backup storage system $100_2$. Since the tracks of the nocopy clone 154 point to the same tracks as the production volume 141, the replica volume 152 on the backup storage volume R2 is a clone of the production volume 141.

Figure 6:
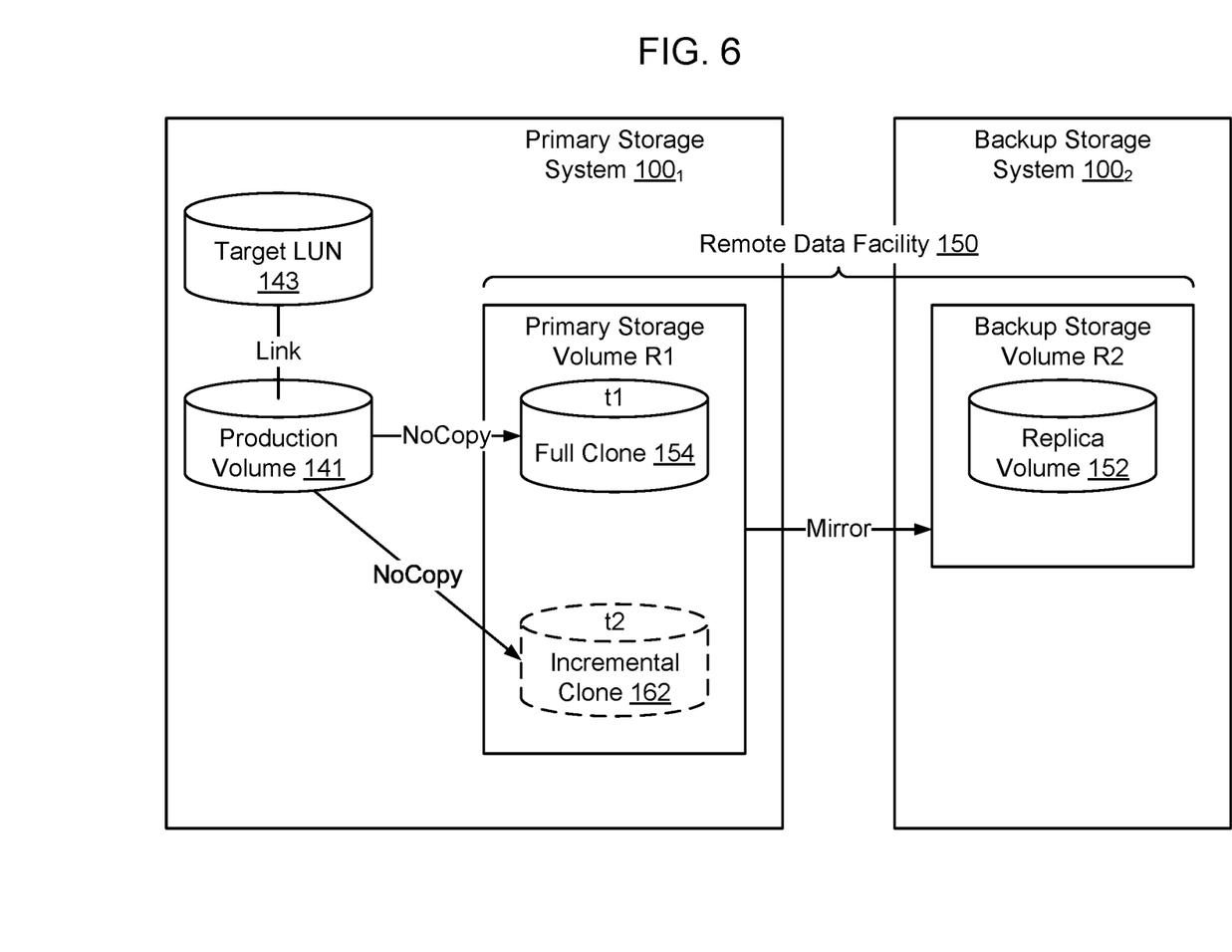
FIG. 6 is a functional block diagram of the primary/backup pair of storage systems of FIG. 2, showing the addition of nocopy incremental clones to the primary storage volume R1 of the remote data facility, according to some embodiments.

FIG. 6 is a functional block diagram of the primary/backup pair of storage systems of FIG. 2, showing the addition of incremental clones of the production volume to the primary storage volume R1 of the remote data facility, according to some embodiments.

FIG. 6 shows a scenario in which a second nocopy clone 162 is created of the production volume 141 and added to the primary storage volume R1 of the remote data facility 150. Specifically, as shown in FIG. 6, it is possible to create an incremental clone 162 at a subsequent points in time containing changes to the production volume 141 that occurred after the full nocopy clone 154 was created. For example, if nocopy clone 154 was created at time=t1, and incremental nocopy cloned 162 is created at time=t2, the incremental nocopy clone 162 will include only changes to the production volume 141 that occurred between time t1 and t2.

When the second nocopy clone 162 is added to the primary storage volume R1, the define process is run on the second nocopy clone 162 to cause the tracks of the incremental nocopy clone 162 to point to the tracks of the production volume 141 containing the data of the production volume 141 at time=t2. Defining the tracks of incremental nocopy clone 162 causes flags corresponding to the tracks of the second nocopy clone 162 to Valid/invalid flags corresponding to the tracks to be marked invalid, which causes the tracks to be transmitted on the remote data facility 150. Once a track of the incremental nocopy clone 162 has been replicated on the remote data facility 150, the invalid status of the associated flag 159 for the track is cleared. By periodically creating incremental nocopy clones and adding the incremental nocopy clones to the primary storage volume R1, it is possible to incrementally transmit changes to the production volume 141 on the remote data facility 150.

Although FIG. 6 shows an incremental nocopy clone 162 as being added to the primary storage volume, in some embodiments a target-less snapshot may be created and linked to a device that is then added to the primary storage volume R1.

Figure 7:
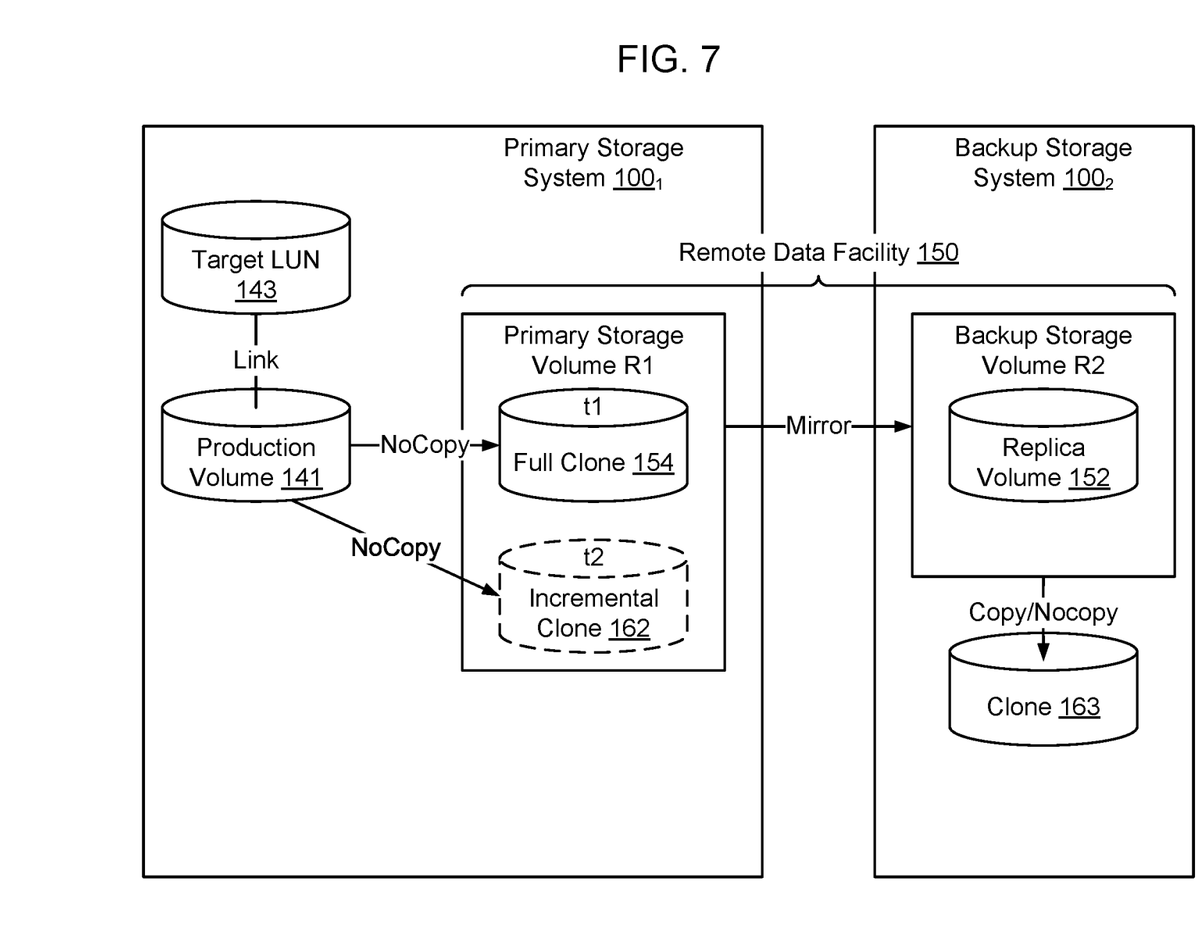
FIG. 7 is a functional block diagram of the primary/backup pair of storage systems of FIG. 2, showing incremental updates of the backup storage volume R2 on the backup storage system, according to some embodiments.

FIG. 7 is a functional block diagram of the primary/backup pair of storage systems 100 of FIG. 2, showing creation of clones of the backup storage volume R2 on the backup storage system $100_2$. As shown in FIG. 7, the backup storage system $100_2$ can create a clone 163 of the content of the backup storage volume R2 using either copy or nocopy technology. As discussed in connection with FIG. 6, by adding incremental clones 162 to the primary storage volume R1, changes to the production volume 141 are propagated on the remote data facility 150 to enable the backup storage volume R2 to be incrementally refreshed. As shown in FIG. 7, a clone 163 is then created on the backup storage system $100_2$, which is a point in time copy of the production volume 141 at the point in time that the clone 163 is created. In some embodiments, the clone 163 contains tracks from both replica volume 152 and updated tracks from incremental clones 162 that have been added to the remote data facility 150.

Figure 8:
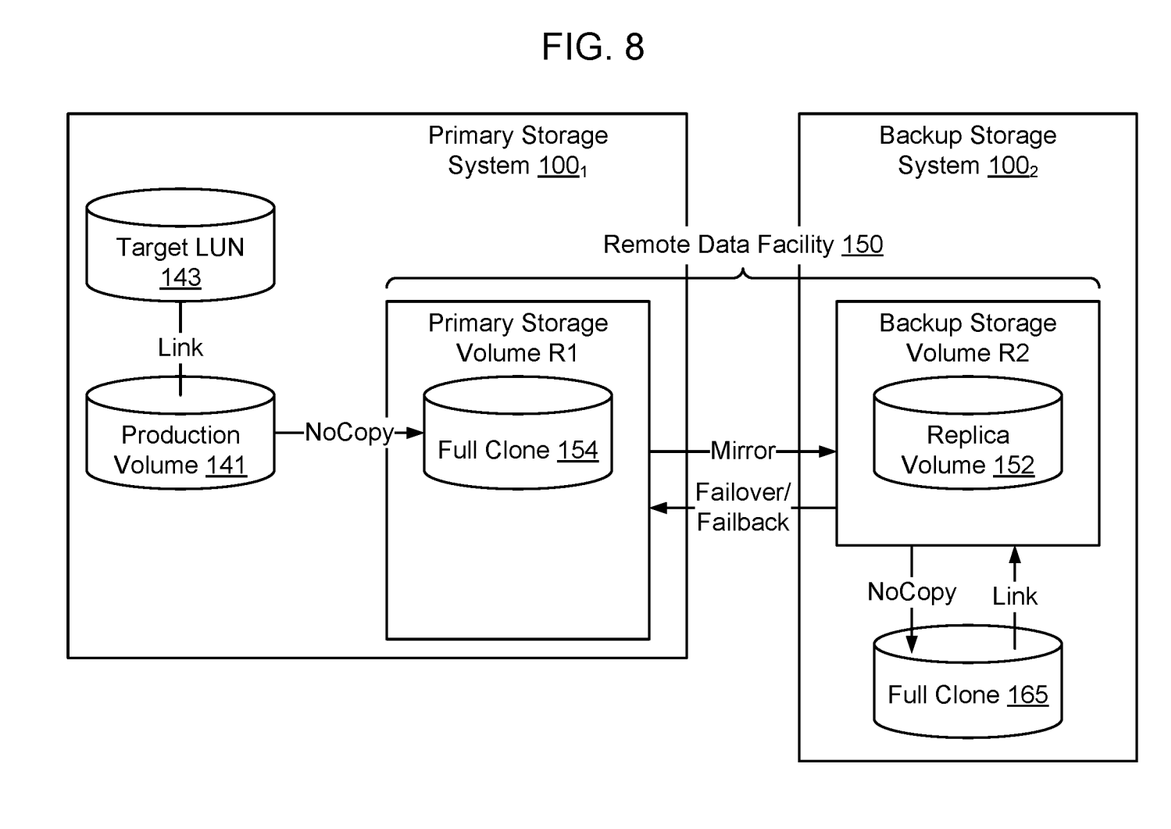
FIG. 8 is a functional block diagram of the primary/backup pair of storage systems of FIG. 2, showing creation of a nocopy clone of the backup storage volume R2 on the backup storage system for use in connection with failover/failback of the production volume, according to some embodiments.

FIG. 8 is a functional block diagram of the primary/backup pair of storage systems 100 of FIG. 2, showing creation of a nocopy clone 165 of the replica volume 152 on the backup storage system 100₂ for use in connection with failover/failback of the production volume 141. The ability to take a nocopy clone 165 of the backup storage volume R2 on the backup storage system 100₂, and then later use this replica clone 165 to have the original data restored to the production volume 141 using failover/failback mechanisms of the remote data facility 150, makes this much faster than existing copy mechanisms.

Figure 9:
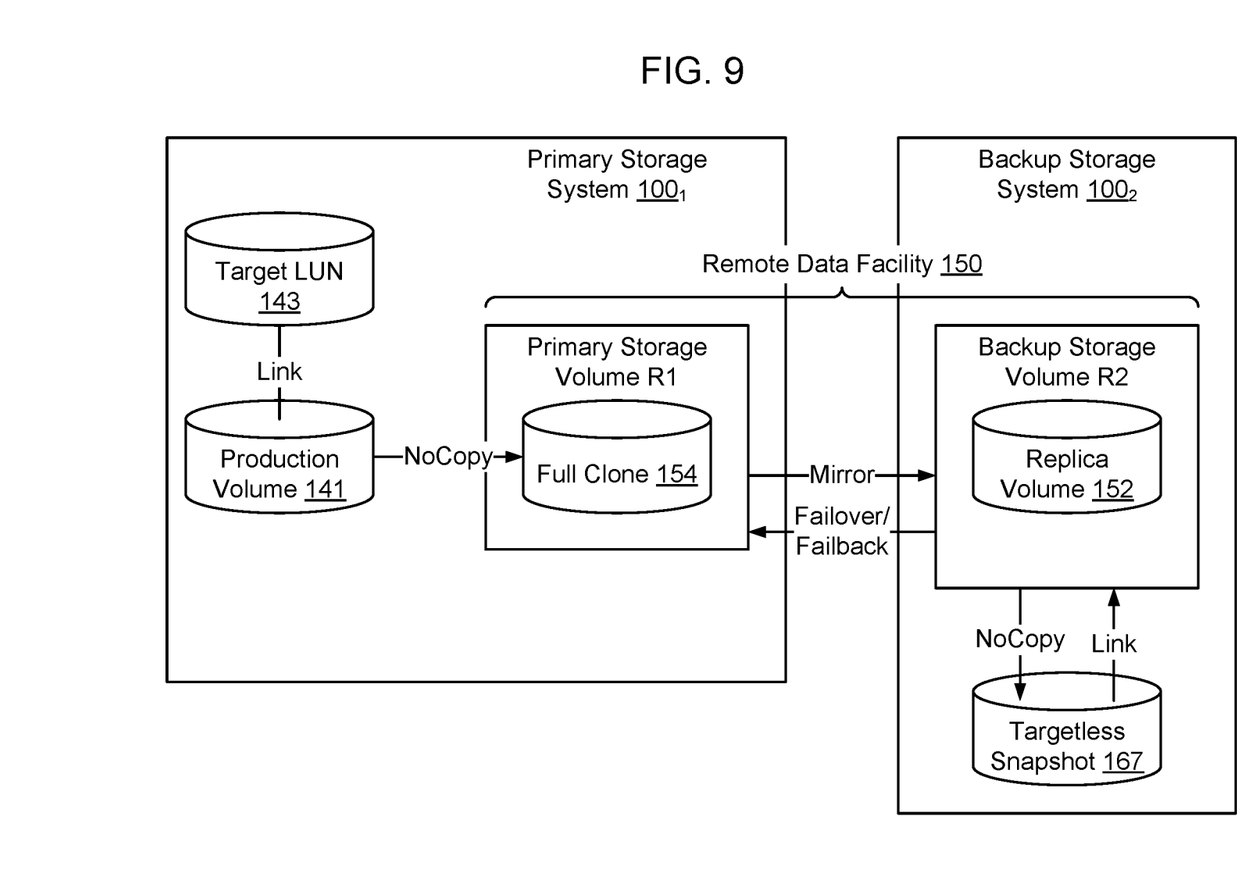
FIG. 9 is a functional block diagram of the primary/backup pair of storage systems of FIG. 2, showing creation of a nocopy target-less snapshot of the backup storage volume R2 on the backup storage system, and then linking the nocopy target-less snapshot to the backup storage volume R2 for use in connection with failover/failback of the production volume, according to some embodiments.

FIG. 9 is a functional block diagram of the primary/backup pair of storage systems 100 of FIG. 2, showing creation of a nocopy targetless snapshot 167 of the backup storage volume R2 on the backup storage system 100₂ for use in connection with failover/failback of the production volume 141. As shown in FIG. 9, it is possible to take a target-less nocopy snapshot 167 of the backup storage volume R2 on the backup storage system 100₂, and then later link this target-less nocopy snapshot 167 to the backup storage volume R2. Linking the target-less nocopy snapshot 167 to the backup storage volume R2 enables the data from the target-less nocopy snapshot 167 to be restored to the primary storage volume R1 using the failover/failback mechanisms of the remote data facility 150, to enable the primary storage volume R1 to be recovered to the point in time associated with creation of the target-less nocopy snapshot 167. Using the nocopy targetless snapshot 167 makes this more space efficient than using background copy mechanisms.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for remote data forwarding on a remote data facility, the computer program including a set of instructions which, when executed by a computer, cause the computer to perform a method comprising the steps of:

creating a nocopy clone of a production volume, the production volume having data stored on backend allocations of tracks of memory;

defining a remote data facility to include a primary storage volume R1 on the first storage system and a backup storage volume R2 on a second storage system;

adding the nocopy clone of the production volume to the primary storage volume R1 of the remote data facility; and replicating the nocopy clone of the production volume from the primary storage volume R1 to the backup storage volume R2 on the remote data facility;

wherein the step of replicating comprises:

using a define process to cause tracks of the nocopy clone to point to the backend allocations of the tracks of memory of the production volume;

setting an invalid flag for each track of the nocopy clone in a first data structure associated with the remote data facility;

for each invalid flag in the first data structure, copying the respective backend allocation of memory on the remote data facility to the backup storage volume R2; and after copying the respective backend allocation on the remote data facility, clearing the respective invalid flag.

2. The non-transitory tangible computer readable storage medium of claim 1, wherein the nocopy clone of the production volume has pointers to the backend allocations of the tracks of memory but does not contain a copy of data contained in the tracks of memory.

3. The non-transitory tangible computer readable storage medium of claim 1, wherein the backend allocations are tracks of memory of a set of managed devices of a first storage system.

4. The non-transitory tangible computer readable storage medium of claim 1, further comprising:

creating a nocopy incremental clone of the production volume, the nocopy incremental clone containing pointers to tracks of the production volume that have changed since creation of a previous clone of the production volume; and adding the nocopy incremental clone of the production volume to the primary storage volume R1 of the remote data facility.

5. The non-transitory tangible computer readable storage medium of claim 1, wherein the step of replicating the nocopy clone of the production volume from the primary storage volume R1 to the backup storage volume R2 on the remote data facility comprises creation of a replica volume at the second storage system.

6. The non-transitory tangible computer readable storage medium of claim 5, further comprising:

creating a backup nocopy clone of the backup storage volume on the second storage system; and linking the backup nocopy clone of the replica volume to the backup storage volume R2.

7. The non-transitory tangible computer readable storage medium of claim 1, further comprising:
creating a nocopy target-less snapshot of the backup storage volume on the second storage system;
linking the nocopy target-less snapshot to the backup storage volume R2; and
using a failover/failback mechanism of the remote data facility to restore data of the nocopy target-less snapshot to the primary storage volume R1.

8. A method of remote data forwarding on a remote data facility, comprising:
creating a nocopy clone of a production volume, the production volume having data stored on backend allocations of tracks of memory;
defining a remote data facility to include a primary storage volume R1 on the first storage system and a backup storage volume R2 on a second storage system;
adding the nocopy clone of the production volume to the primary storage volume R1 of the remote data facility; and
replicating the nocopy clone of the production volume from the primary storage volume R1 to the backup storage volume R2 on the remote data facility;
wherein the step of replicating comprises:
using a define process to cause tracks of the nocopy clone to point to the backend allocations of the tracks of memory of the production volume;
setting an invalid flag for each track of the nocopy clone in a first data structure associated with the remote data facility;
for each invalid flag in the first data structure, copying the respective backend allocation of memory on the remote data facility to the backup storage volume R2; and
after copying the respective backend allocation on the remote data facility, clearing the respective invalid flag.

9. The method of claim 8, wherein the nocopy clone of the production volume has pointers to the backend allocations of the tracks of memory but does not contain a copy of data contained in the tracks of memory.

10. The method of claim 8, wherein the backend allocations are tracks of memory of a set of managed devices of a first storage system.

11. The method of claim 8, further comprising:
creating a nocopy incremental clone of the production volume, the nocopy incremental clone containing pointers to tracks of the production volume that have changed since creation of a previous clone of the production volume; and
adding the nocopy incremental clone of the production volume to the primary storage volume R1 of the remote data facility.

12. The method of claim 8, wherein the step of replicating the nocopy clone of the production volume from the primary storage volume R1 to the backup storage volume R2 on the remote data facility comprises creation of a replica volume at the second storage system.

13. The method of claim 12, further comprising:
creating a backup nocopy clone of the backup storage volume on the second storage system; and
linking the backup nocopy clone of the replica volume to the backup storage volume R2.

14. The method of claim 8, further comprising:
creating a nocopy target-less snapshot of the backup storage volume on the second storage system;
linking the nocopy target-less snapshot to the backup storage volume R2; and
using a failover/failback mechanism of the remote data facility to restore data of the nocopy target-less snapshot to the primary storage volume R1.

\* \* \* \* \*